US012024177B2

(12) United States Patent
Kawaharada et al.

(10) Patent No.: US 12,024,177 B2
(45) Date of Patent: Jul. 2, 2024

(54) SENSOR ABNORMALITY ESTIMATION DEVICE

(71) Applicant: TOYOTA JIDOSHA KABUSHIKI KAISHA, Toyota (JP)

(72) Inventors: Makoto Kawaharada, Susono (JP); Hiroshi Sakamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 17/689,573

(22) Filed: Mar. 8, 2022

(65) Prior Publication Data

US 2022/0324463 A1 Oct. 13, 2022

(30) Foreign Application Priority Data

Apr. 13, 2021 (JP) .................................. 2021-067779

(51) Int. Cl.
*B60W 40/105* (2012.01)
*G08G 1/08* (2006.01)

(52) U.S. Cl.
CPC ............. *B60W 40/105* (2013.01); *G08G 1/08* (2013.01); *B60W 2420/408* (2024.01); *B60W 2552/53* (2020.02); *B60W 2554/4041* (2020.02); *B60W 2554/4049* (2020.02)

(58) Field of Classification Search
CPC ....... B60W 40/105; B60W 2554/4041; B60W 2552/53; B60W 2554/4049; B60W 2420/52; G08G 1/08
See application file for complete search history.

(56) References Cited

U.S. PATENT DOCUMENTS

2020/0207362 A1    7/2020   Nishida et al.

FOREIGN PATENT DOCUMENTS

| CN | 114902295 A | * | 8/2022 | ...... B60W 30/18154 |
| JP | 2008242544 A | * | 10/2008 | ............. G08G 1/165 |
| JP | 2009157668 A | * | 7/2009 | |
| JP | 2020-104547 A | | 7/2020 | |
| WO | 2020230253 A1 | | 11/2020 | |
| WO | 2020230254 A1 | | 11/2020 | |

OTHER PUBLICATIONS

Machine Translation of JP2009157668A PDF File Name: "JP2009157668A_Machine_Translation.pdf".*
Machine Translation of JP2008242544A PDF File Name: "JP2008242544A_Machine_Translation.pdf".*
Machine Translation of CN114902295A PDF File Name: "CN114902295A_Machine_Translation.pdf".*

* cited by examiner

*Primary Examiner* — Grant Moubry
*Assistant Examiner* — Ruben Picon-Feliciano
(74) *Attorney, Agent, or Firm* — Dinsmore & Shohl LLP

(57) ABSTRACT

A sensor abnormality estimation device determines whether or not a position and a speed of a sensor-mounted vehicle at an intersection fulfill a predetermined performance condition. When the position and the speed fulfill the performance condition, the sensor abnormality estimation device acquires recognition results obtained by two of a plurality of external sensors, for a target object at a designated position associated with the position of the sensor-mounted vehicle. The sensor abnormality estimation device then acquires a degree of coincidence between the recognition results, and determines that there is an abnormality in at least one of the two external sensors when the degree of coincidence is lower than a predetermined determination value.

13 Claims, 12 Drawing Sheets

SENSOR ABNORMALITY ESTIMATION DEVICE

CROSS-REFERENCE TO RELATED APPLICATION

This application claims priority to Japanese Patent Application No. 2021-067779 filed on Apr. 13, 2021, incorporated herein by reference in its entirety.

BACKGROUND

1. Technical Field

The present disclosure relates to a sensor abnormality estimation device for a sensor-mounted vehicle mounted with a plurality of external sensors.

2. Description of Related Art

In Japanese Unexamined Patent Application Publication No. 2020-104547 (JP 2020-104547 A), there is disclosed an art of detecting malfunctions in a plurality of outside sensors mounted in a vehicle. In this art, recognition results of objects in overlapping regions of detection ranges of the outside sensors are compared with one another. It is then diagnosed whether or not the respective outside sensors malfunction, based on this comparison result, environmental information on the vehicle, and environmentally-resistant properties of the outside sensors.

SUMMARY

In a sensor-mounted vehicle mounted with a plurality of external sensors that recognize a peripheral situation of a vehicle, the application of the art of JP 2020-104547 A is taken into account. In the art of JP 2020-104547 A, the timing for diagnosing whether or not the sensors malfunction is not deeply considered. Therefore, there is an apprehension that the accuracy of malfunction diagnosis may fall when there is a certain object in a certain moving state in an overlapping region of detection ranges of the external sensors. Besides, there is also an apprehension that the computation load may increase when the diagnosis on malfunctions of the sensors is carried out with a certain frequency.

The present disclosure has been accomplished in view of the foregoing problems. It is an object of the present disclosure to provide an art enabling the enhancement of estimation accuracy and the reduction of computation load by selecting timings of an abnormality estimation process for a plurality of external sensors in a sensor-mounted vehicle mounted therewith.

The present disclosure provides a sensor abnormality estimation device for solving the foregoing problems. The sensor abnormality estimation device of the present disclosure is a sensor abnormality estimation device for a sensor-mounted vehicle mounted with a plurality of external sensors. The sensor abnormality estimation device is equipped with at least one memory that stores at least one program, and at least one processor that is linked with the at least one memory. The at least one processor performs an abnormality estimation process for determining whether or not a position and a speed of the sensor-mounted vehicle fulfill a predetermined performance condition at an intersection where an own lane and a cross lane intersect with each other when the at least one program is executed, acquiring recognition results obtained by two of the external sensors for a target object at a designated position associated with the position of the sensor-mounted vehicle when the performance condition is fulfilled, acquiring a degree of coincidence between the recognition results, and estimating that there is an abnormality in at least one of the two external sensors when the degree of coincidence is lower than a predetermined determination value.

In the sensor abnormality estimation device of the present disclosure, the external sensors may include a sensor that recognizes an object in front of the sensor-mounted vehicle with respect to a traveling direction thereof. In this case, the performance condition may be that the sensor-mounted vehicle is stopped at a head of a line of vehicles waiting to enter the intersection in the own lane, and the target object may be a vehicle at a head of a line of vehicles waiting to enter the intersection in a lane opposite the own lane.

In the sensor abnormality estimation device of the present disclosure, the external sensors may include a sensor that recognizes an object to the right or left of the sensor-mounted vehicle with respect to a traveling direction thereof. In this case, the performance condition may be that the sensor-mounted vehicle travels straight in the own lane at the intersection at a speed lower than a predetermined speed, and the target object may be a vehicle at a head of a line of vehicles waiting to enter the intersection in the cross lane.

In the sensor abnormality estimation device of the present disclosure, the external sensors may include a sensor that recognizes an object behind the sensor-mounted vehicle with respect to a traveling direction thereof. In this case, the performance condition may be that the sensor-mounted vehicle travels straight in the own lane at the intersection at a speed lower than a predetermined speed, and the target object may be a vehicle at a head of a line of vehicles waiting to enter the intersection in a right-turn lane or a left-turn lane that is adjacent to the own lane.

In the sensor abnormality estimation device of the present disclosure, the external sensors may include a sensor that recognizes an object behind the sensor-mounted vehicle with respect to a traveling direction thereof. In this case, the performance condition may be that the sensor-mounted vehicle turns right or left at the intersection from the own lane to the cross lane at a speed lower than a predetermined speed, and the target object may be a vehicle at a head of a line of vehicles waiting to enter the intersection in the cross lane.

In the sensor abnormality estimation device of the present disclosure, the at least one processor may perform a sensor accuracy fall determination process for determining whether or not an accuracy of the recognition results has fallen when the at least one program is executed, and perform a filtering process for removing the recognition results from a target of the abnormality estimation process when it is determined in the sensor accuracy fall determination process that the accuracy of the recognition results has fallen. Besides, the speed of the sensor-mounted vehicle at the intersection may be controlled to a speed lower than a predetermined speed limit when it is determined in the sensor accuracy fall determination process that the accuracy of the recognition results has fallen.

According to the sensor abnormality estimation device of the present disclosure, when the position and the speed of the sensor-mounted vehicle fulfill the predetermined performance condition, the sensor abnormality estimation process is performed for the target object at the designated position associated with the position of the sensor-mounted vehicle, at the intersection. According to this process, a timing enabling the selection of the target object at such a position that the speed thereof relative to the sensor-mounted vehicle is low and that the recognition thereof is easy from the sensor-mounted vehicle can be found. Thus, the enhancement of the estimation accuracy of the sensor abnormality estimation process and the reduction of the computation load can be achieved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the present disclosure will be described hereinafter with reference to the drawings. It should be noted, however, that when numerals such as the number, quantity, amount, and range of each of elements are mentioned in the embodiments that will be described below, this disclosure is not limited to the mentioned numerals, unless otherwise specified or unless those numerals are obviously indispensable in principle. Besides, the structures and the like that will be described in the following embodiments are not absolutely necessary for this disclosure, unless otherwise specified or unless the adoption of the structures and the like is obviously indispensable in principle.

First Embodiment 1-1. Configuration Example of Sensor-Mounted Vehicle

Figure 1:
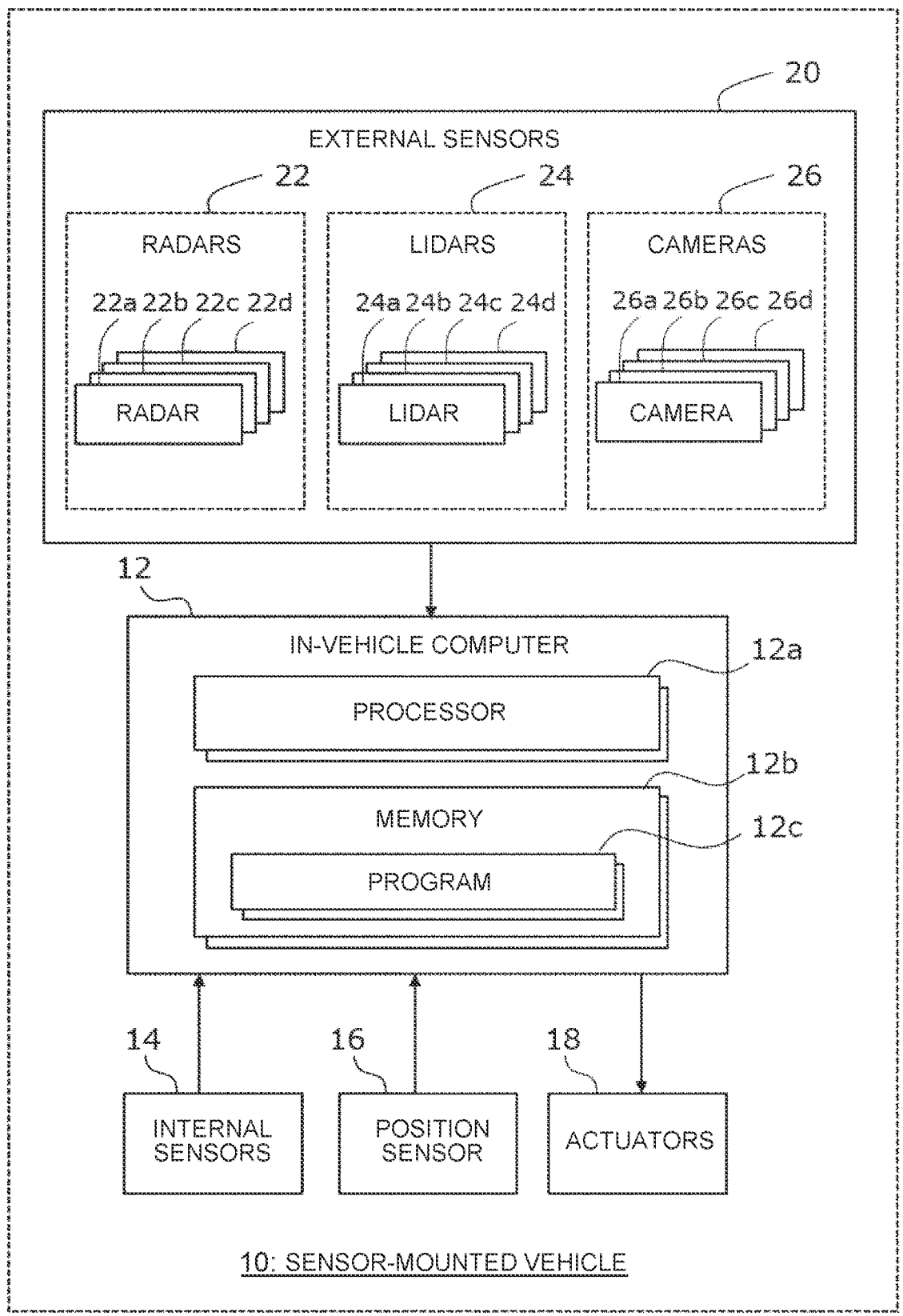
FIG. 1 is a block diagram showing an example of the configuration of a sensor-mounted vehicle to which a sensor abnormality estimation device according to one of the embodiments of the present disclosure is applied.

FIG. 1 is a block diagram showing an example of the configuration of a sensor-mounted vehicle to which a sensor abnormality estimation device according to one of the embodiments of the present disclosure is applied. A sensor-mounted vehicle 10 is mounted with a plurality of external sensors 20 for recognizing a peripheral situation. The sensor-mounted vehicle 10 may be an automatically-driven vehicle that can run without being attended by a driver, or a manually-driven vehicle that is manually driven by a driver. The sensor-mounted vehicle 10 will be referred to hereinafter simply as the vehicle 10.

The vehicle 10 is equipped with an in-vehicle computer 12. The in-vehicle computer 12 is an ensemble of electronic control units (ECU's) mounted in the vehicle 10. Besides, the vehicle 10 is equipped with internal sensors 14, a position sensor 16, actuators 18, and the external sensors 20.

The in-vehicle computer 12 is equipped with at least one processor 12a (hereinafter referred to simply as the processor 12a) and at least one memory 12b (hereinafter referred to simply as the memory 12b) linked with the processor 12a. In the memory 12b, at least one program 12c (hereinafter referred to simply as the program 12c) that can be executed by the processor 12a, and various pieces of information on the program 12c are stored.

The processor 12a realizes various processes by executing the program 12c. The program 12c includes, for example, a sensor abnormality estimation program for causing the in-vehicle computer 12 to function as a sensor abnormality estimation device that will be described later. The program 12c is stored in the memory 12b. Besides, a map database for managing map information is stored in the memory 12b.

The internal sensors 14 include state sensors that acquire information on the movement of the vehicle 10. As the state sensors, for example, wheel speed sensors, an acceleration sensor, an angular velocity sensor, and a steering angle sensor are exemplified. Each of the acceleration sensor and the angular velocity sensor may be an IMU. Information obtained from the internal sensors 14 is transmitted to the in-vehicle computer 12.

The position sensor 16 detects a position and an orientation of the vehicle 10. A global positioning system (GPS) sensor is exemplified as the position sensor 16. Information obtained from the external sensors 20 is transmitted to the in-vehicle computer 12.

The actuators 18 include a steering device that steers the vehicle 10, a drive device that drives the vehicle 10, and a braking device that brakes the vehicle 10. The steering device includes, for example, a power steering system, a steer-by-wire steering system, and a rear-wheel steering system. The drive device includes, for example, an engine, an EV system, and a hybrid system. The braking device includes, for example, a hydraulic brake and an electric power regeneration brake. The actuators 18 act in accordance with control signals transmitted from the in-vehicle computer 12.

Figure 2:
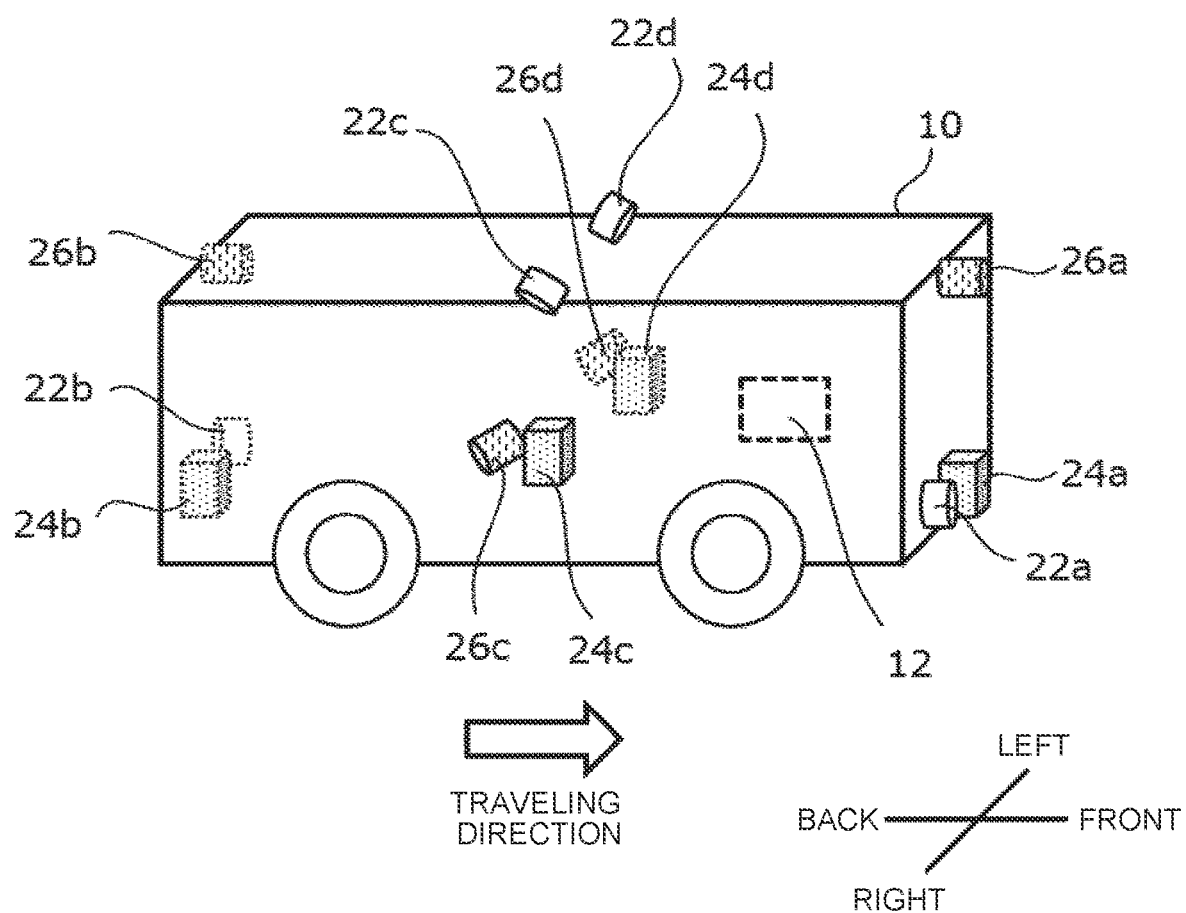
FIG. 2 is a view showing an example of the arrangement of a plurality of external sensors mounted in the vehicle.

The external sensors 20 recognize a peripheral situation of the vehicle 10. The vehicle 10 is mounted with radars 22, laser imaging detection and ranging (LiDARs) 24, and cameras 26 as the external sensors 20. FIG. 2 is a view showing an example of the arrangement of the external sensors mounted in the vehicle. In the following description, the front, back, right, and left of the vehicle 10 are defined with respect to a traveling direction of the vehicle 10.

The radars 22 detect an object around the vehicle 10 through the use of, for example, electric waves of laser radars, millimeter-wave radars, and the like. The radars 22 include a front radar 22a, a rear radar 22b, a right side radar 22c, and a left side radar 22d. The front radar 22a is installed at a center of a front end of the vehicle 10. The rear radar 22b is installed at a center of a rear end of the vehicle 10. The right side radar 22c and the left side radar 22d are installed on a roof of the vehicle 10.

The LiDARs 24 detect an object around the vehicle 10 through the use of light. The LiDARs 24 include a front LiDAR 24a, a rear LiDAR 24b, a right side LiDAR 24c, and a left side LiDAR 24d. The front LiDAR 24a is installed at the center of the front end of the vehicle 10. The rear LiDAR 24b is installed at the center of the rear end of the vehicle 10. The right side LiDAR 24c and the left side LiDAR 24d are installed on lower portions of right and left mirrors of the vehicle 10 respectively.

The cameras 26 image a peripheral situation of the vehicle 10. The cameras 26 include a front camera 26a, a rear camera 26b, a right side camera 26c, and a left side camera 26d. The front camera 26a is installed on an upper side of a windshield in a vehicle interior of the vehicle 10. The rear camera 26b is installed on an upper side of a rear glass in the vehicle interior of the vehicle 10. The right side camera 26c and the left side camera 26d are installed on the lower portions of the right and left mirrors of the vehicle 10 respectively.

The recognition range of the front radar 22a, the front LiDAR 24a, and the front camera 26a covers at least an area in front of the vehicle 10 in the traveling direction thereof. For example, when the vehicle 10 is located at the head of a line of vehicles waiting to enter an intersection where an own lane and a cross lane intersect with each other, the recognition range covers a line of vehicles waiting to enter the intersection in a lane opposite the own lane, namely, a line of vehicles in the lane on the other side of the intersection across the cross lane.

The recognition range of the rear radar 22b, the rear LiDAR 24b, and the rear camera 26b covers at least an area behind the vehicle 10 in the traveling direction thereof. For example, when the vehicle 10 travels straight at the intersection where the own lane and the cross lane intersect with each other, the recognition range covers a line of vehicles in a right-turn lane or a left-turn lane that is adjacent to the own lane at a position short of the intersection. Alternatively, when the vehicle 10 turns right or left into the cross lane at the intersection, the recognition range covers at least one vehicle that is visible behind across the intersection in the cross lane.

The recognition range of the right side radar 22c, the right side LiDAR 24c, and the right side camera 26c covers at least an area to the right of the vehicle 10 in the traveling direction thereof. For example, when the vehicle 10 travels straight at the intersection where the own lane and the cross lane intersect with each other, the recognition range covers at least one vehicle that is visible to the right of the vehicle 10 in the cross lane.

The recognition range of the left side radar 22d, the left side LiDAR 24d, and the left side camera 26d covers at least an area to the left of the vehicle 10 in the traveling direction thereof. For example, when the vehicle 10 travels straight at the intersection where the own lane and the cross lane intersect with each other, the recognition range covers at least one vehicle that is visible to the left of the vehicle 10 in the cross lane.

1-2. Abnormality Estimation Process for External Sensors

The in-vehicle computer 12 of the vehicle 10 of the present embodiment performs a sensor abnormality estimation process for estimating whether or not there is an error in calibration of the external sensors 20. In the sensor abnormality estimation process, recognition results of a common target object OJ are acquired through the use of sensor outputs of at least two of the sensors constituting the external sensors 20 and including the target object OJ in the recognition range thereof, respectively. This process is called "a target object recognition process". For example, recognition results of the target object OJ included in the recognition range are acquired through the use of the front radar 22a and the front LiDAR 24a that have an overlapping recognition range in front of the vehicle among the external sensors 20.

The acquired recognition results are converted into outputs that can be compared with each other, if necessary. This process is called "a sensor output conversion process". In the sensor output conversion process, for example, recognition results of the target object OJ obtained by the front radar 22a and the front LiDAR 24a are projected onto a 2D overhead view, and a lap rate of the projected target object OJ is computed.

The computed lap rate serves as an index for determining a degree of coincidence between the recognition results of the target object OJ obtained by the external sensors 20. The computed lap rate is compared with a predetermined determination value. This process is called "a coincidence degree determination process". A value prescribed in advance as a lower-limit of the degree of coincidence that makes it possible to determine that the calibration of the sensors is unnecessary is used as the determination value for use in the coincidence degree determination process. In the coincidence degree determination process, when the degree of coincidence is lower than the determination value, it can be determined that there is an abnormality requiring calibration in at least one of the front radar 22a and the front LiDAR 24a.

It should be noted herein that the accuracy of the sensor abnormality estimation process may fall when the external sensors 20 acquire certain recognition results. For example, at night, the shutter speed is low, so the imaging of the target object OJ by the cameras 26 may be blurred (motion blur may occur). Besides, when the speed of the target object OJ relative to the vehicle 10 is high, the obtainment of inaccurate recognition results of the target object OJ acquired by the external sensors 20 is also possible.

In the sensor abnormality estimation process of the present embodiment, with a view to coping with the foregoing apprehension, performance conditions on the position and speed of the vehicle 10 that are to be fulfilled in performing the sensor abnormality estimation process are determined, and an object at a designated position associated with the position of the vehicle 10 is determined as the target object OJ to be selected in the sensor abnormality estimation process. These conditions will be described hereinafter in more detail.

Figure 3:
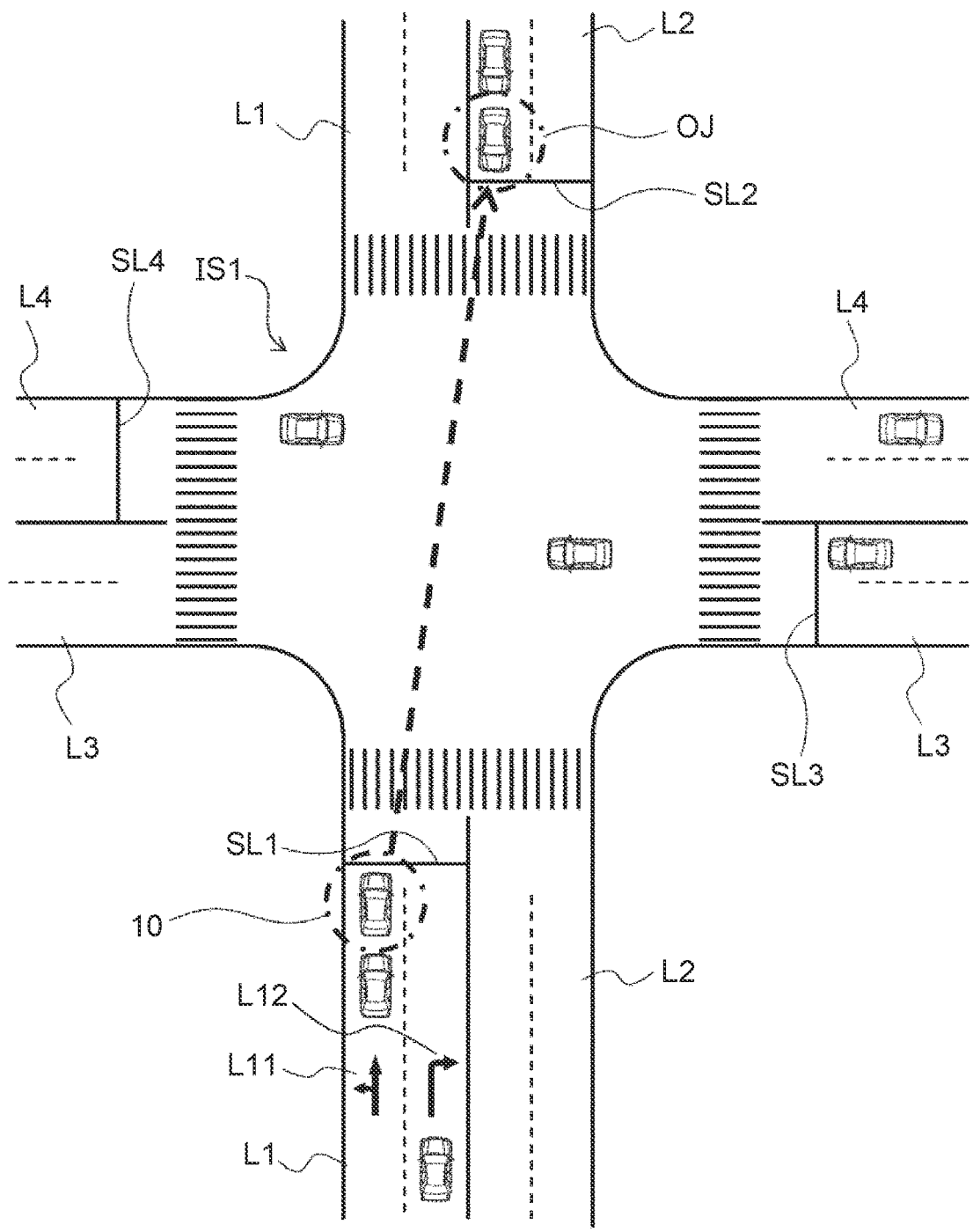
FIG. 3 is a view for illustrating a performance condition on a sensor abnormality estimation process for the external sensors having an area in front of the vehicle as a recognition range thereof.

<Performance Condition 1> Performance Condition for Sensor Abnormality Estimation Process for External Sensors having Area in Front of Vehicle as Recognition Range Thereof In the sensor abnormality estimation process, the desirability thereof increases as the speed of the target object OJ relative to the vehicle 10 falls. FIG. 3 is a view for illustrating the performance condition on the sensor abnormality estimation process for the external sensors having an area in front of the vehicle as the recognition range thereof. The example shown in FIG. 3 handles the performance condition in the sensor abnormality estimation process using at least two of the front radar 22a, the front LiDAR 24a, and the front camera 26a of the vehicle 10, which have the area in front of the vehicle 10 as the recognition range thereof. In the example shown in FIG. 3, an intersection IS1 provided in an own lane L1 in which the vehicle 10 runs is depicted. The own lane L1 has a dedicated lane L11 for traveling straight or turning left, and a right-turn lane L12 for turning right. Besides, an oncoming lane L2 is adjacent to the own lane L1. At the intersection IS1, the own lane L1 and the oncoming lane L2 intersect with cross lanes L3 and L4. The cross lane L4 is an oncoming lane adjacent to the cross lane L3. The number of lanes in each of the own lane L1, the oncoming lane L2, and the cross lanes L3 and L4 is not limited. In a traffic environment example shown in FIG. 3, two lanes are depicted in each of these lanes.

Stop lines SL1, SL2, SL3, and SL4 for prescribing stop positions in waiting to enter the intersection IS1 are provided in the own lane L1, the oncoming lane L2, and the cross lanes L3 and L4 respectively. In the traffic environment example shown in FIG. 3, for example, when a traffic light for the own lane L1 is "red" at the intersection IS1, a line of vehicles waiting to enter the intersection IS1 is predicted to be formed behind the stop line SL1 in the own lane L1. The performance condition 1 in the sensor abnormality estimation process is that the vehicle 10 is stopped at the head of the line of vehicles in the own lane L1. Incidentally, the performance condition mentioned herein may be fulfilled when the vehicle 10 is stopped at any of the lanes with which the own lane L1 is equipped.

When the traffic light for the own lane L1 is "red" at the intersection IS1, a traffic light for the oncoming lane L2 is usually "red" as well. Therefore, when the performance condition is fulfilled, a line of vehicles waiting to enter the intersection IS1 is predicted to be formed behind the stop line SL2 in the oncoming lane L2. Thus, when the vehicle 10 is stopped at the head of the line of vehicles in the own lane L1, the target object OJ is the first vehicle in the line of vehicles waiting to enter the intersection IS1 in the oncoming lane L2. Incidentally, in the case where the oncoming lane L2 is constituted of a plurality of lanes and there are a plurality of lines of vehicles waiting to enter the intersection IS1, the target object OJ may be the first vehicle in any one of those lanes.

The target object OJ fulfilling an object condition in the performance condition 1 is likely to be stopped, so the speed of the target object OJ relative to the vehicle 10 may be held low. Besides, each of the vehicle 10 and the target object OJ is the first vehicle in the line of vehicles waiting to enter the intersection IS1, so it is easy to recognize the target object OJ through the use of the external sensors 20 having the area in front of the vehicle as the recognition range thereof. In this manner, according to the performance condition 1, the sensor abnormality estimation process for the front radar 22a, the front LiDAR 24a, and the front camera 26a of the vehicle 10, which have the area in front of the vehicle 10 as the recognition range thereof, can be performed with accuracy.

Figure 4:
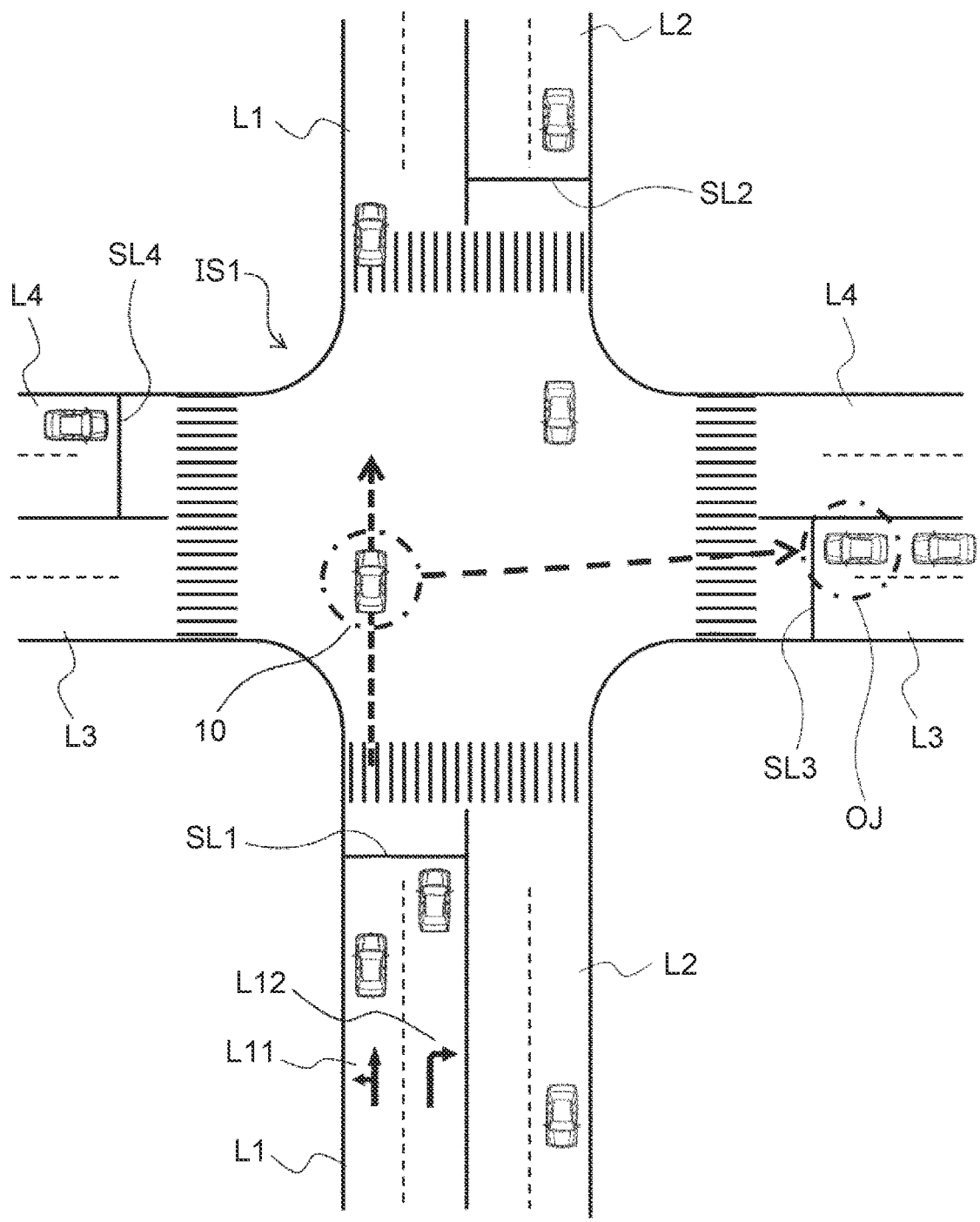
FIG. 4 is a view for illustrating a performance condition on the sensor abnormality estimation process for the external sensors having an area to the right of the vehicle as a recognition range thereof.

<Performance Condition 2> Performance Condition for Sensor Abnormality Estimation Process for External Sensors having Area to Right of Vehicle as Recognition Range Thereof FIG. 4 is a view for illustrating a performance condition on the sensor abnormality estimation process for the external sensors having an area to the right of the vehicle as the recognition range thereof. The performance condition shown in FIG. 4 is applied to the sensor abnormality estimation process using at least two of the right side radar 22c, the right side LiDAR 24c, and the right side camera 26c that have the area to the right of the vehicle 10 as the recognition range thereof. In the example shown in FIG. 4, an intersection similar to the intersection IS1 shown in FIG. 3 is depicted. In a traffic environment shown in FIG. 4, for example, when the traffic light for the own lane L1 turns from "red" to "green" at the intersection IS1, a vehicle waiting to enter the intersection IS1 is considered to enter the intersection IS1 at low speed in the own lane L1. The performance condition 2 is that the vehicle 10 travels straight at a speed lower than a predetermined speed in the own lane L1 within the intersection IS1. As the predetermined speed mentioned herein, a value set in advance as an upper limit of the vehicle speed that can permit an error in recognition of the target object OJ by the external sensors 20 is used.

When the traffic light for the own lane L1 is "green" at the intersection IS1, a traffic light for the cross lane L3 is usually "red". Therefore, when the performance condition is fulfilled, a line of vehicles waiting to enter the intersection IS1 is predicted to be formed behind the stop line SL3 in the cross lane L3. The object condition on the target object OJ mentioned herein is fulfilled by the first vehicle in a line of vehicles waiting to enter the intersection IS1 in the cross lane L3.

The target object OJ fulfilling the object condition in the performance condition 2 is likely to be stopped, so the speed of the target object OJ relative to the vehicle 10 is held low. Besides, the target object OJ is the first vehicle in the line of vehicles waiting to enter the intersection IS1, so it is easy to recognize the target object OJ through the use of the external sensors 20 having the area to the right of the vehicle 10 as the recognition range thereof. In this manner, according to the performance condition 2, the sensor abnormality estimation process for the right side radar 22c, the right side LiDAR 24c, and the right side camera 26c of the vehicle 10, which have the area to the right of the vehicle 10 as the recognition range thereof, can be performed with accuracy.

Figure 5:
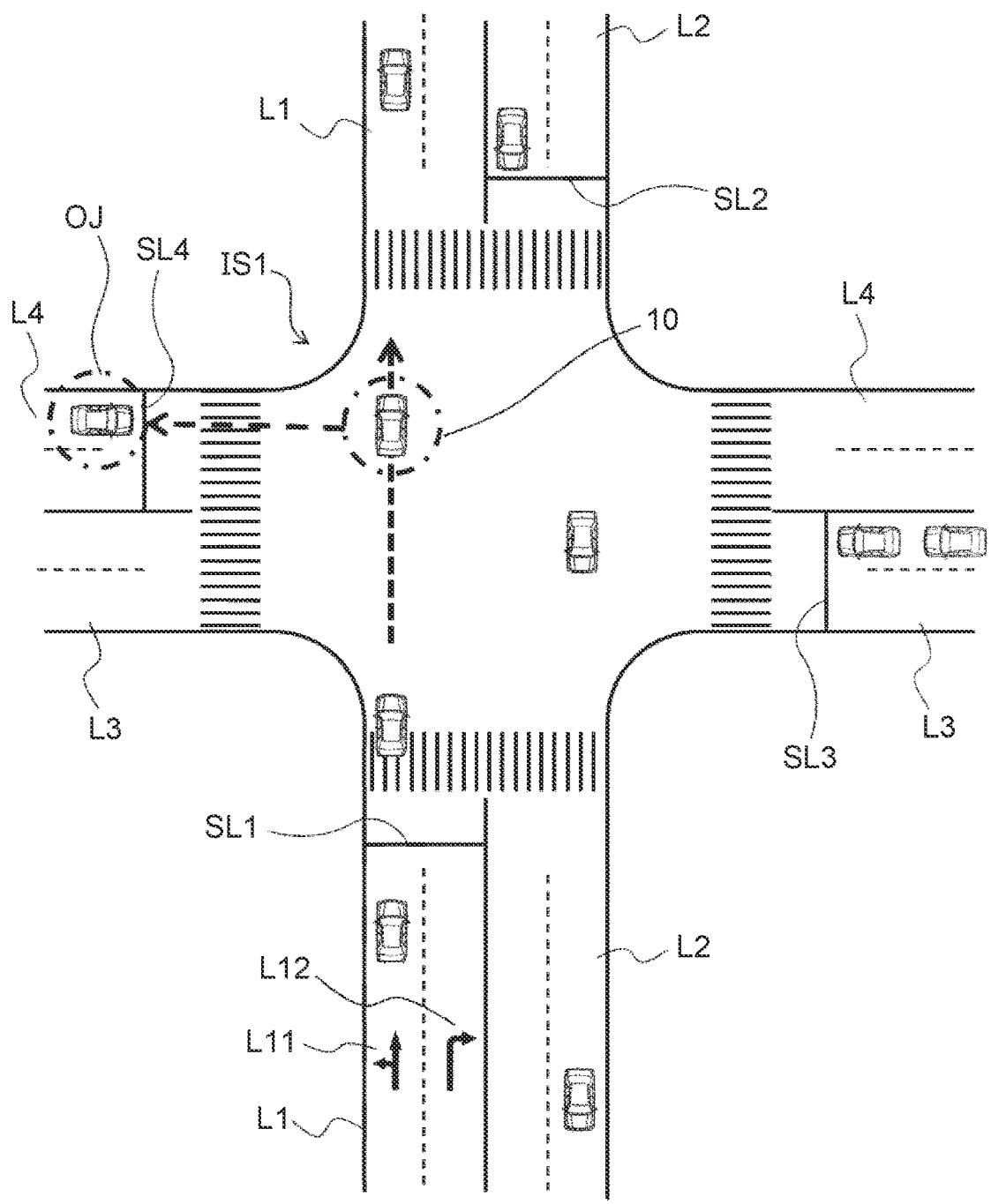
FIG. 5 is a view for illustrating a performance condition on the sensor abnormality estimation process for the external sensors having an area to the left of the vehicle as a recognition range thereof.

<Performance Condition 3> Performance Condition for Sensor Abnormality Estimation Process for External Sensors having Area to Left of Vehicle as Recognition Range Thereof FIG. 5 is a view for illustrating a performance condition on the sensor abnormality estimation process for the external sensors having an area to the left of the vehicle as the recognition range thereof. The performance condition shown in FIG. 5 is applied to the sensor abnormality estimation process using at least two of the left side radar 22d, the left side LiDAR 24d, and the left side camera 26d of the vehicle 10. In the example shown in FIG. 5, an intersection similar to the intersection IS1 shown in FIG. 4 is depicted. As is the case with the performance condition 2, the performance condition 3 is that the vehicle 10 travels straight at a speed lower than a predetermined speed in the own lane L1 within the intersection IS1.

When the traffic light for the own lane L1 is "green" at the intersection IS1, a traffic light for the cross lane L4 is usually "red". Therefore, when the performance condition 3 is fulfilled, a line of vehicles waiting to enter the intersection IS1 is predicted to be formed behind the stop line SL4 in the cross lane L4. Thus, the object condition on the target object OJ mentioned herein is fulfilled by the first vehicle in the line of vehicles waiting to enter the intersection IS1 in the cross lane L4.

The target object OJ fulfilling the object condition in the performance condition 3 is likely to be stopped, so the speed of the target object OJ relative to the vehicle 10 is held low. Besides, the target object OJ is the first vehicle in the line of vehicles waiting to enter the intersection IS1, so it is easy to recognize the target object OJ through the use of the external sensors 20 having the area to the left of the vehicle 10 as the recognition range thereof. In this manner, according to the performance condition 3, the sensor abnormality estimation process for the left side radar 22d, the left side LiDAR 24d, and the left side camera 26d of the vehicle 10, which have the area to the left side of the vehicle 10 as the recognition range thereof, can be performed with accuracy.

Figure 6:
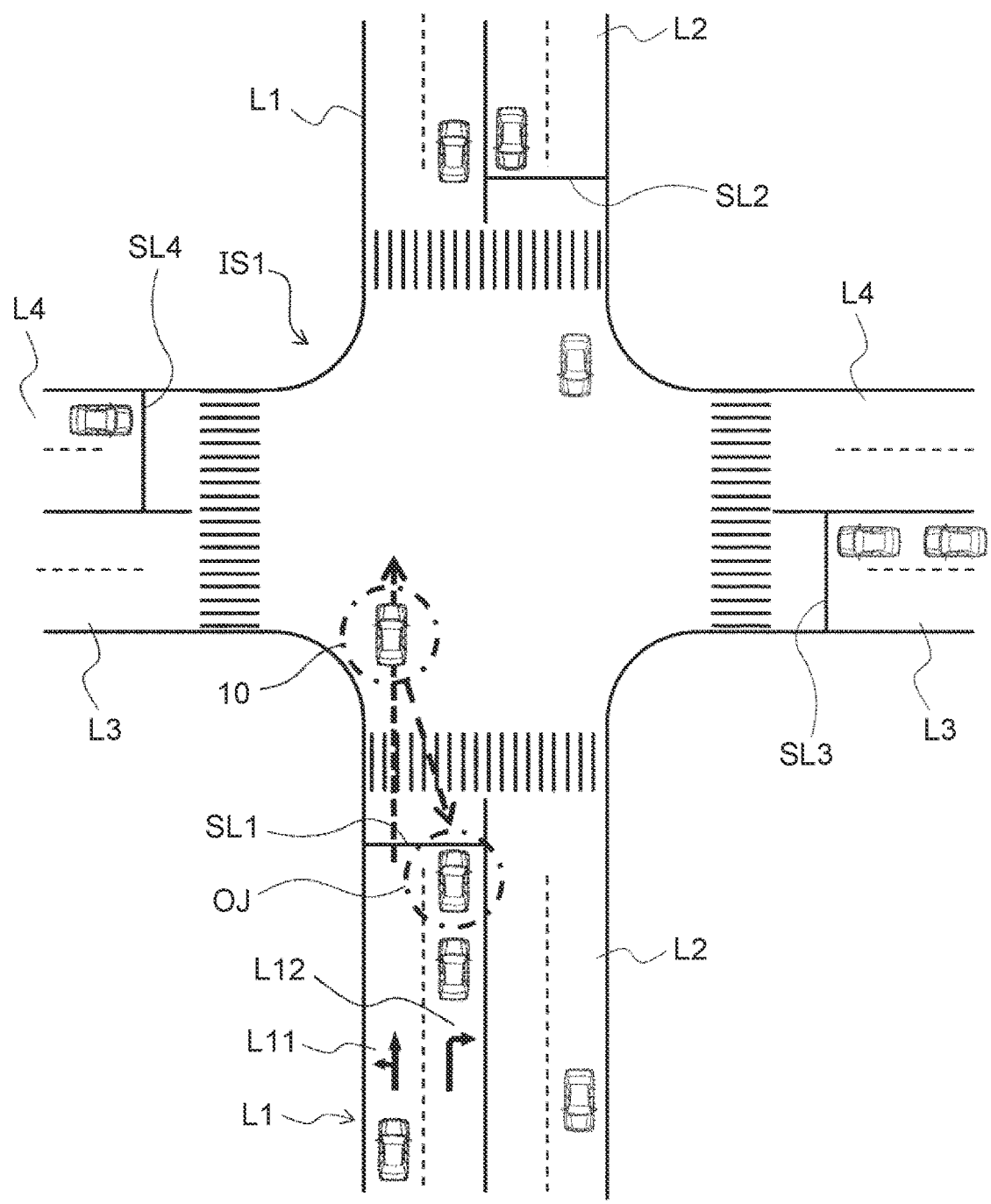
FIG. 6 is a view for illustrating a performance condition on the sensor abnormality estimation process for the external sensors having an area behind the vehicle as a recognition range thereof.

<Performance Condition 4-1> Performance Condition for Sensor Abnormality Estimation Process for External Sensors having Area Behind Vehicle as Recognition Range Thereof FIG. 6 is a view for illustrating a performance condition on the sensor abnormality estimation process for the external sensors having an area behind the vehicle as the recognition range thereof. The performance condition shown in FIG. 6 is applied to the sensor abnormality estimation process using at least two of the rear radar 22b, the rear LiDAR 24b, and the rear camera 26b of the vehicle 10. In the example shown in FIG. 6, an intersection similar to the intersection IS1 shown in FIG. 3 is depicted. Besides, a dedicated right-turn traffic light is provided for the right-turn lane L12 at the intersection IS1. In a traffic environment shown in FIG. 6, for example, when a traffic light for the dedicated lane L11 turns from "red" to "green" at the intersection IS1, a vehicle waiting to enter the intersection IS1 in the dedicated lane L11 is considered to enter the intersection IS1 at low speed. The performance condition 4-1 is that the vehicle 10 travels straight at a speed lower than a predetermined speed in the dedicated lane L11 of the own lane L1 within the intersection IS1.

When the traffic light for the dedicated lane L11 of the own lane L1 is "green" at the intersection IS1, the traffic light for the right-turn lane L12 of the own lane L1 is usually "red". Therefore, when the performance condition is fulfilled, a line of vehicles waiting to enter the intersection IS1 in the right-turn lane L12 is predicted to be formed behind the stop line SL1. Thus, the object condition on the target object OJ mentioned herein is fulfilled by the first vehicle in the line of vehicles waiting to enter the intersection IS1 in the right-turn lane L12.

The target object OJ of the performance condition 4-1 is likely to be stopped, so the speed of the target object OJ relative to the vehicle 10 is held low. Besides, the target object OJ is the first vehicle in the line of vehicles waiting to enter the intersection IS1, so it is easy to recognize the target object OJ through the use of the rear radar 22b, the rear LiDAR 24b, and the rear camera 26b of the vehicle 10. Thus, according to the performance condition 4, the sensor abnormality estimation process for the rear radar 22b, the rear LiDAR 24b, and the rear camera 26b of the vehicle 10, which have the area behind the vehicle 10 as the recognition range thereof, can be performed with accuracy.

Incidentally, the performance condition 4-1 is also applicable to an intersection where the own lane L1 has a dedicated left-turn lane. In this case, the condition for the right-turn lane L12 may be applied to the dedicated left-turn lane.

Figure 7:
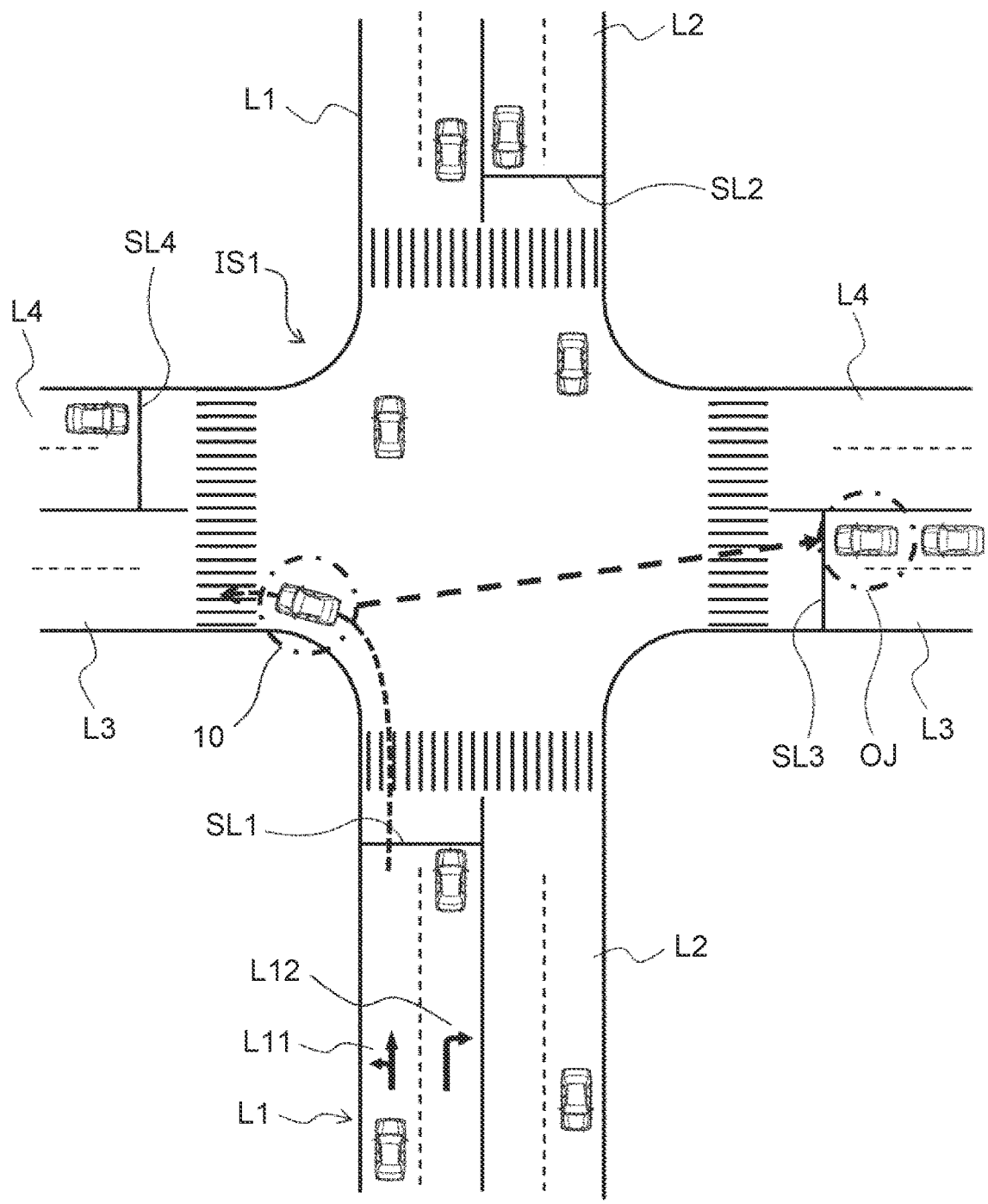
FIG. 7 is a view for illustrating another example of the performance condition on the sensor abnormality process for the external sensors having the area behind the vehicle as the recognition range thereof.

<Performance Condition 4-2> Performance Condition for Sensor Abnormality Estimation Process for External Sensors having Area Behind Vehicle as Recognition Range Thereof FIG. 7 is a view for illustrating another example of the performance condition on the sensor abnormality estimation process for the external sensors having the area behind the vehicle as the recognition range thereof. The performance condition shown in FIG. 7 is another example of the performance condition on the sensor abnormality estimation process using at least two of the rear radar 22b, the rear LiDAR 24b, and the rear camera 26b of the vehicle 10. In the example shown in FIG. 7, an intersection similar to the intersection IS1 shown in FIG. 6 is depicted. In a traffic environment shown in FIG. 7, for example, when the traffic light for the dedicated lane L11 turns from "red" to "green" at the intersection IS1, a vehicle waiting to enter the intersection IS1 in the dedicated lane L11 is considered to enter the intersection IS1 at low speed. The performance condition 4-2 is that the vehicle 10 turns left from the dedicated lane L11 to the cross lane L3 at the intersection IS1 at a speed lower than a predetermined speed.

When the traffic light for the dedicated lane L11 of the own lane L1 is "green" at the intersection IS1, the traffic light for the cross lane L3 is usually "red". Therefore, when the performance condition is fulfilled, a line of vehicles waiting to enter the intersection IS1 is predicted to be formed behind the stop line SL3 in the cross lane L3. Thus, the object condition on the target object OJ mentioned herein is fulfilled by the first vehicle in the line of vehicles waiting to enter the intersection IS1 in the cross lane L3.

The target object OJ of the performance condition 4-2 is likely to be stopped, so the speed of the target object OJ relative to the vehicle 10 is held low. Besides, the target object OJ is the first vehicle in the line of vehicles waiting to enter the intersection IS1, so it is easy to recognize the target object OJ through the use of the rear radar 22b, the rear LiDAR 24b, and the rear camera 26b of the vehicle 10. In this manner, according to the performance condition 4, the sensor abnormality estimation process for the rear radar 22b, the rear LiDAR 24b, and the rear camera 26b of the vehicle 10, which have the area behind the vehicle 10 as the recognition range thereof, can be performed with accuracy.

Figure 8:
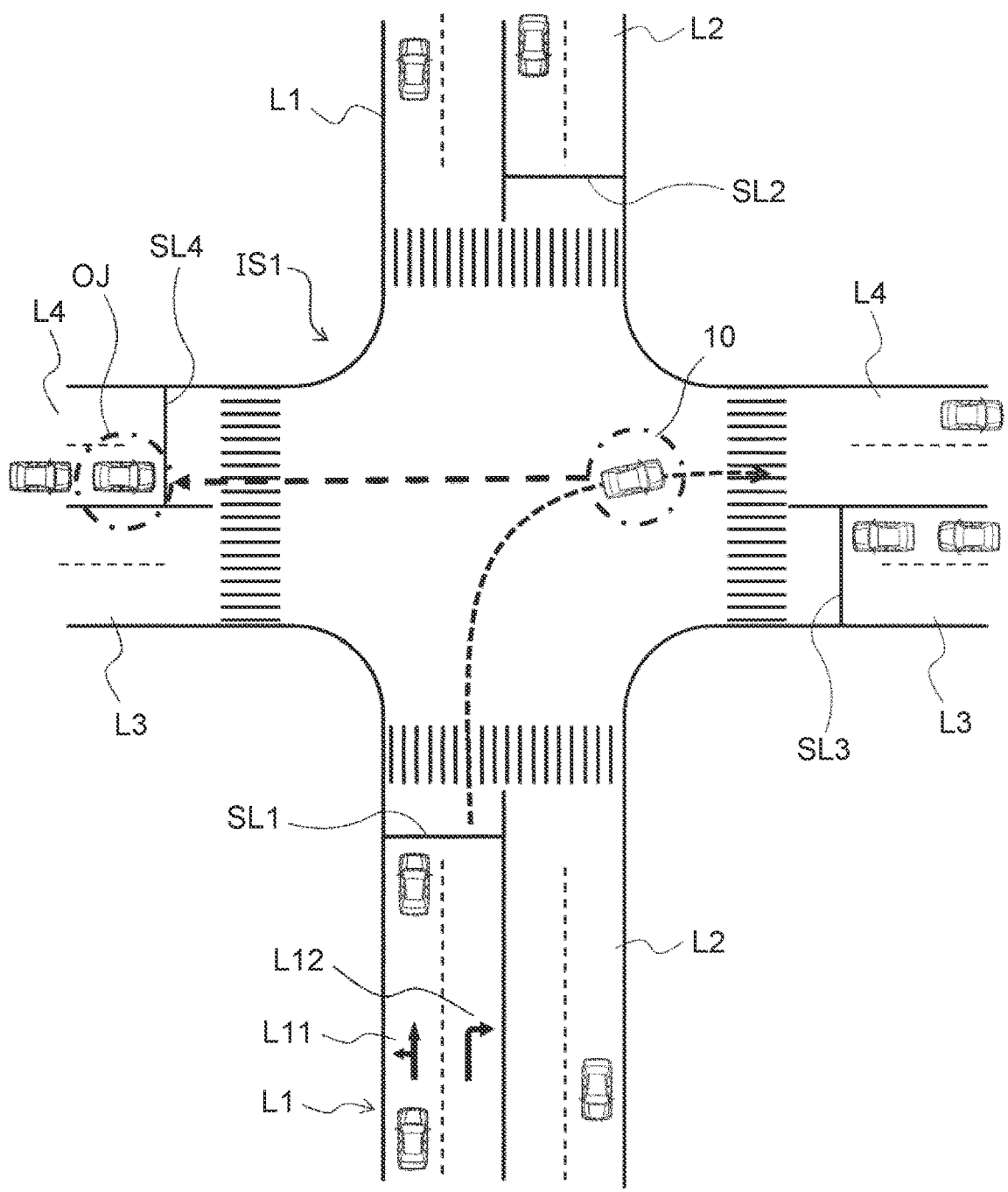
FIG. 8 is a view for illustrating still another example of the performance condition on the sensor abnormality process for the external sensors having the area behind the vehicle as the recognition range thereof.

<Performance Condition 4-3> Performance Condition for Sensor Abnormality Estimation Process for External Sensors having Area Behind Vehicle as Recognition Range Thereof FIG. 8 is a view for illustrating another example of the performance condition on the sensor abnormality estimation process for the external sensors having the area behind the vehicle as the recognition range thereof. The performance condition shown in FIG. 8 is another example of the condition on the sensor abnormality estimation process using at least two of the rear radar 22b, the rear LiDAR 24b, and the rear camera 26b of the vehicle 10. In the example shown in FIG. 8, an intersection similar to the intersection IS1 shown in FIG. 6 is depicted. In a traffic environment shown in FIG. 8, for example, when the traffic light for the right-turn lane L12 turns from "red" to "green" at the intersection IS1, a vehicle waiting to enter the intersection IS1 in the right-turn lane L12 is considered to enter the intersection IS1 at low speed. The performance condition 4-3 is that the vehicle 10 turns right from the right-turn lane L12 to the cross lane L4 at the intersection IS1 at a speed lower than a predetermined speed.

When the traffic light for the right-turn lane L12 of the own lane L1 is "green" at the intersection IS1, the traffic light for the cross lane L4 is usually "red". Therefore, when the performance condition is fulfilled, a line of vehicles waiting to enter the intersection IS1 is predicted to be formed behind the stop line SL4 in the cross lane L4. In the object condition, the target object OJ is another vehicle at the head of the line of vehicles waiting to enter the intersection IS1 in the cross lane L4.

The target object OJ of the performance condition 4-3 is likely to be stopped, so the speed of the target object OJ relative to the vehicle 10 is held low. Besides, the target object OJ is the first vehicle in the line of vehicles waiting to enter the intersection IS1, so it is easy to recognize the target object OJ through the use of the rear radar 22b, the rear LiDAR 24b, and the rear camera 26b of the vehicle 10. In this manner, according to the performance condition 4, the sensor abnormality estimation process for the rear radar 22b, the rear LiDAR 24b, and the rear camera 26b of the vehicle 10, which have the area behind the vehicle 10 as the recognition range thereof, can be performed with accuracy.

Figure 9:
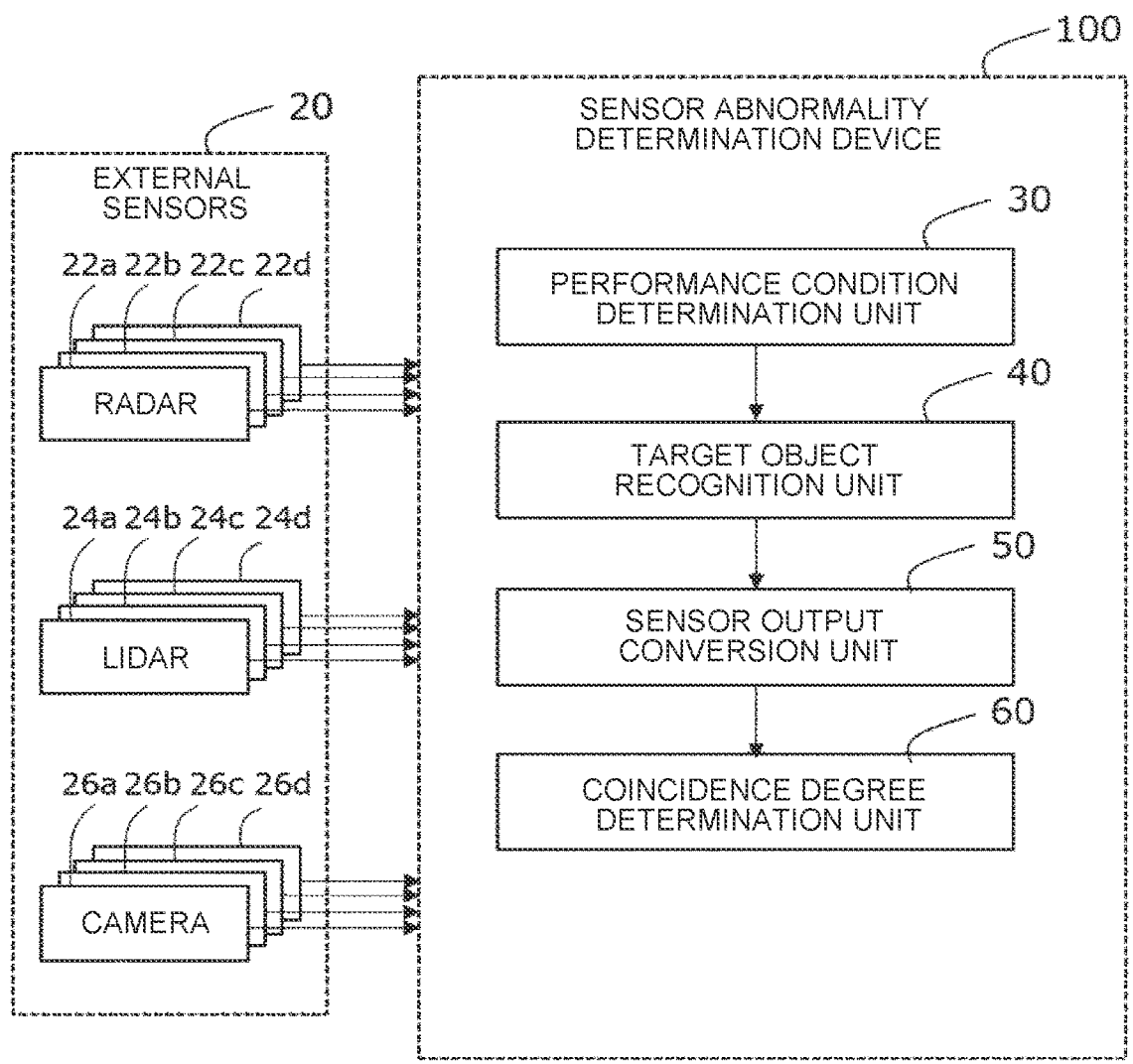
FIG. 9 is a block diagram showing the functions of a sensor abnormality estimation device of the first embodiment.

1-3. Functional Configuration of Sensor Abnormality Estimation Device of First Embodiment The aforementioned sensor abnormality estimation process can be realized by a sensor abnormality estimation device 100. In FIG. 9, functions belonging to the in-vehicle computer 12 are represented as blocks respectively. The sensor abnormality estimation device 100 according to the embodiment will be described hereinafter, focusing mainly on the respective functions of the in-vehicle computer 12. It should be noted, however, that the description of the configuration and functions that have been already described will be omitted or simplified.

The sensor abnormality estimation device 100 is equipped with a performance condition determination unit 30, a target object recognition unit 40, a sensor output conversion unit 50, and a coincidence degree determination unit 60. These units are realized as the functions of the in-vehicle computer (ECU) 12 when the processor 12a executes the sensor abnormality estimation program included in the program 12c stored in the memory 12b of the in-vehicle computer 12.

1-3-1. Performance Condition Determination Unit 30

The performance condition determination unit 30 is a functional block for performing a performance condition determination process for determining whether or not the performance condition is fulfilled. In the performance condition determination process, the performance condition determination unit 30 acquires a position and a speed of the vehicle 10 on a map, based on information on the position of the vehicle 10 received by the position sensor 16, information on the movement of the vehicle 10 detected by the internal sensors 14, and map information obtained from a map database. The performance condition determination unit 30 then determines whether or not the acquired position and speed of the vehicle 10 fulfill any one of the performance conditions 1 to 4. The result of the determination of the performance condition determination process is transmitted to the target object recognition unit 40.

1-3-2. Target Object Recognition Unit 40

The target object recognition unit 40 is a functional block for performing a target object recognition process for recognizing the target object OJ through the use of the external sensors 20. Typically, the target object recognition unit 40 recognizes the target object OJ that fulfills the object condition corresponding to the fulfilled performance condition through the use of at least two of the external sensors 20, when the result of the determination transmitted from the performance condition determination unit 30 is positive. The sensor outputs as recognition results are transmitted to the sensor output conversion unit 50.

1-3-3. Sensor Output Conversion Unit 50

The sensor output conversion unit 50 is a functional block for performing a sensor output conversion process, if necessary, for two sensor outputs transmitted from the target object recognition unit 40. Typically, in the sensor output conversion process, when a sensor output of one of the radars 22 and a sensor output of one of the LiDARs 24 or a plurality of sensor outputs of the radars 22 are input, the sensor output conversion unit 50 projects data on the target object OJ included in those sensor outputs onto a 2D overhead view. The sensor output conversion unit 50 then computes a lap rate of the projected data on the target object OJ.

Alternatively, when a sensor output of one of the radars 22 and a sensor output of one of the cameras 26 are input, the sensor output conversion unit 50 subjects a 3D object of the target object OJ included in the sensor output of the camera 26 to 2D conversion. The sensor output conversion unit 50 then projects the data on the target object OJ subjected to 2D conversion and the data on the target object OJ included in the sensor output of the radar 22 onto the 2D overhead view, and computes a lap rate thereof.

Alternatively, when a plurality of sensor outputs of the LiDARs 24 are input, the sensor output conversion unit 50 computes a lap rate of 3D data on the target object OJ included in the sensor outputs.

Alternatively, when a sensor output of one of the LiDARs 24 and a sensor output of one of the cameras 26 are input, the sensor output conversion unit 50 subjects a 3D object of the target object OJ included in the sensor output of the camera 26 to 2D conversion. The sensor output conversion unit 50 then projects the data on the target object OJ subjected to 2D conversion and the data on the target object OJ included in the sensor output of the LiDAR 24 onto the 2D overhead view, and computes a lap rate thereof. Alternatively, the sensor output conversion unit 50 projects a group of points included in the sensor output of the LiDAR 24 onto an image of the target object OJ included in the sensor output of the camera 26, and computes a lap rate thereof.

Alternatively, when a plurality of sensor outputs of the cameras 26 are input, the sensor output conversion unit 50 computes a lap rate of 3D objects of the target object OJ included in the sensor outputs. The computed lap rate is transmitted to the coincidence degree determination unit 60.

1-3-4. Coincidence Degree Determination Unit 60

The coincidence degree determination unit 60 is a functional block for performing a coincidence degree determination process. In the coincidence degree determination process, the coincidence degree determination unit 60 compares the lap rate transmitted from the sensor output conversion unit 50 with a predetermined determination value. Then in the coincidence degree determination process, when the lap rate is lower than the predetermined value, it is possible to determine that there is an abnormality requiring calibration in one or both of the two external sensors 20 used in the target object recognition process.

1-4. Sensor Abnormality Estimation Method According to First Embodiment

Figure 10:
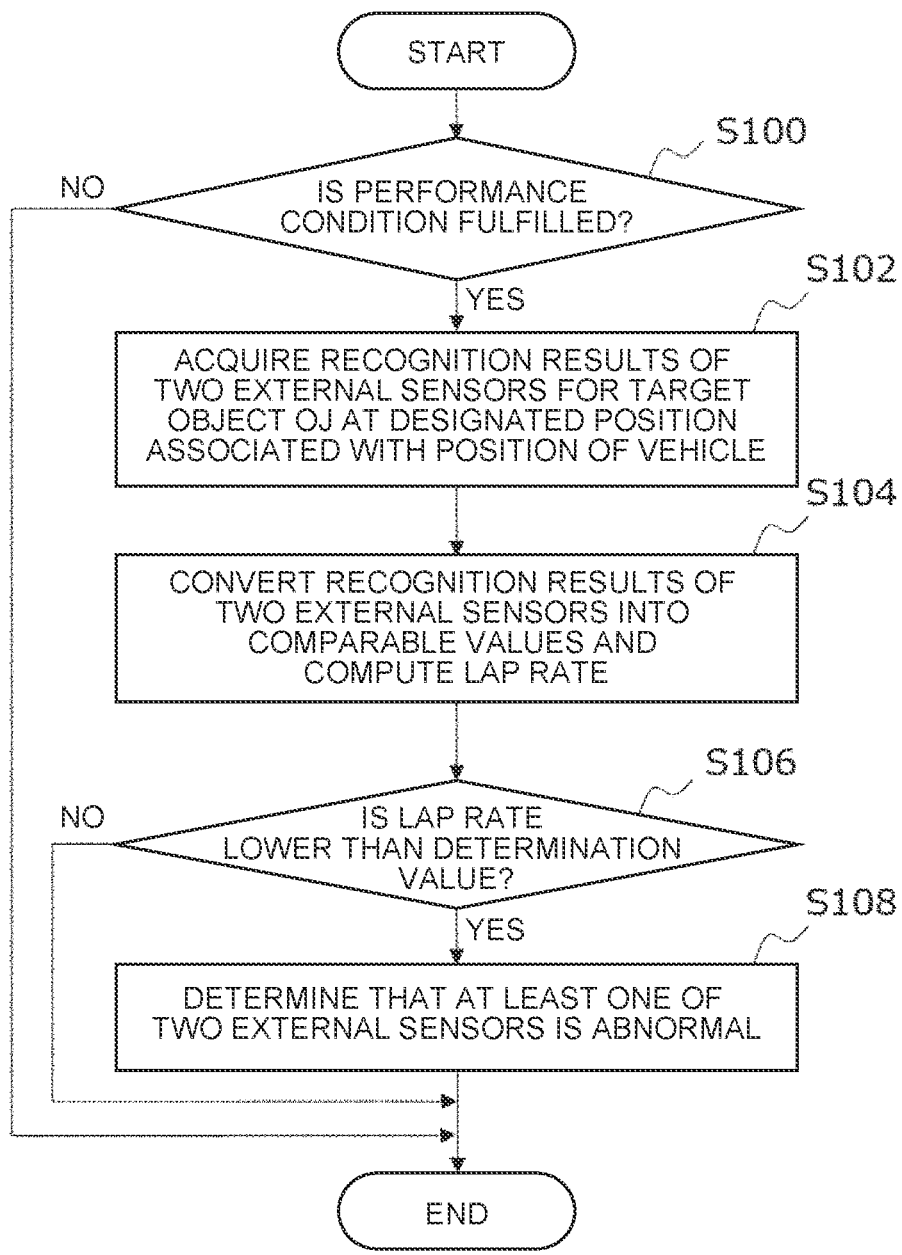
FIG. 10 is a flowchart for illustrating the flow of the sensor abnormality estimation process according to the first embodiment.

Next, a sensor abnormality estimation method according to the first embodiment of the present disclosure will be described using FIG. 10. FIG. 10 is a flowchart for illustrating the flow of the sensor abnormality estimation process according to the first embodiment. The routine of the flowchart shown in FIG. 10 is repeatedly executed during the running of the vehicle 10.

In step S100 of the routine of FIG. 10, the performance condition determination unit 30 determines whether or not the performance condition on the sensor abnormality estimation process is fulfilled. If the result of the determination is negative, the present routine is ended. If the result of the determination is positive, a transition to step S102 is made.

In step S102, the target object recognition unit 40 performs the target object recognition process. In this case, the target object recognition unit 40 acquires recognition results obtained by two of the external sensors 20 for the target object OJ at a designated position associated with a position of the vehicle 10 at an intersection. Upon the completion of the processing of step S102, the process proceeds to step S104.

In step S104, the sensor output conversion unit 50 converts the recognition results acquired in step S104 into comparable data, and then calculates a lap rate of the data obtained through conversion.

In step S106, the coincidence degree determination unit 60 determines whether or not the lap rate computed in step S104 is lower than the predetermined determination value. If the result of the determination is negative, it is determined that there is no abnormality requiring calibration in the external sensors 20, and the present routine is ended. On the other hand, if the result of the determination in step S106 is positive, a transition to subsequent step S108 is made, and it is determined that there is an abnormality requiring calibration in one or both of the two external sensors 20 used in the target object recognition process. In this case, the in-vehicle computer 12 prohibits the sensor outputs of the two external sensors 20 from being utilized for control. Alternatively, a process of notifying the driver of the vehicle 10 of the occurrence of the abnormality may be performed.

In this manner, the sensor abnormality estimation device 100 of the first embodiment can find a timing enabling the selection of the target object OJ that moves at a low speed relative to the vehicle 10 and that is located at a position easily recognizable from the vehicle 10, at the intersection. Thus, the enhancement of the estimation accuracy in the sensor abnormality estimation process and the reduction of the computation load can be achieved.

1-5. Modification Examples

The sensor abnormality estimation device 100 of the present embodiment may adopt aspects modified as follows.

The sensor abnormality estimation device 100 may not necessarily be mounted in the vehicle 10. That is, one, some or all of the functions of the sensor abnormality estimation device 100 may be arranged in a server connected to the vehicle 10 through a communication network.

The intersection where the sensor abnormality estimation device 100 performs the sensor abnormality estimation process may not necessarily be the intersection IS1. That is, the sensor abnormality estimation process of the sensor abnormality estimation device 100 of the present disclosure is widely applicable to any intersection where the performance condition for the vehicle 10 and the object condition for the target object OJ can be fulfilled.

In the case where the vehicle 10 is equipped with three or more of the external sensors 20 having an overlapping recognition region, the abnormal external sensor may be identified by performing the sensor abnormality estimation process for two of the three external sensors extracted in a round-robin manner.

Second Embodiment

2-1. Configuration of Sensor-Mounted Vehicle of Second Embodiment

A sensor-mounted vehicle of the second embodiment is identical in configuration to the sensor-mounted vehicle 10 of the first embodiment shown in FIG. 1. Accordingly, the detailed description of the sensor-mounted vehicle 10 of the second embodiment will be omitted.

2-2. Characteristics of Abnormality Estimation Process for External Sensors According to Second Embodiment The sensor outputs detected by the external sensors 20 may include inaccurate values. For example, when the speed relative to a measured object is high, the accuracy in recognizing the object by the cameras 26 as the external sensors 20 may fall due to motion blur. This tendency is noticeable especially at night.

Thus, the sensor abnormality estimation device 100 of the second embodiment determines whether or not the sensor accuracy of the sensor output as to the target object OJ recognized in the target object recognition unit 40 has fallen, in performing the sensor output conversion process. This process will be referred to hereinafter as "a sensor accuracy fall determination process". The sensor output of the external sensor 20 as to which it is determined in the sensor accuracy fall determination process that the sensor accuracy has fallen is filtered through a filtering process. Such an action can prevent the sensor output with low sensor accuracy from being utilized in the target object recognition process.

Figure 11:
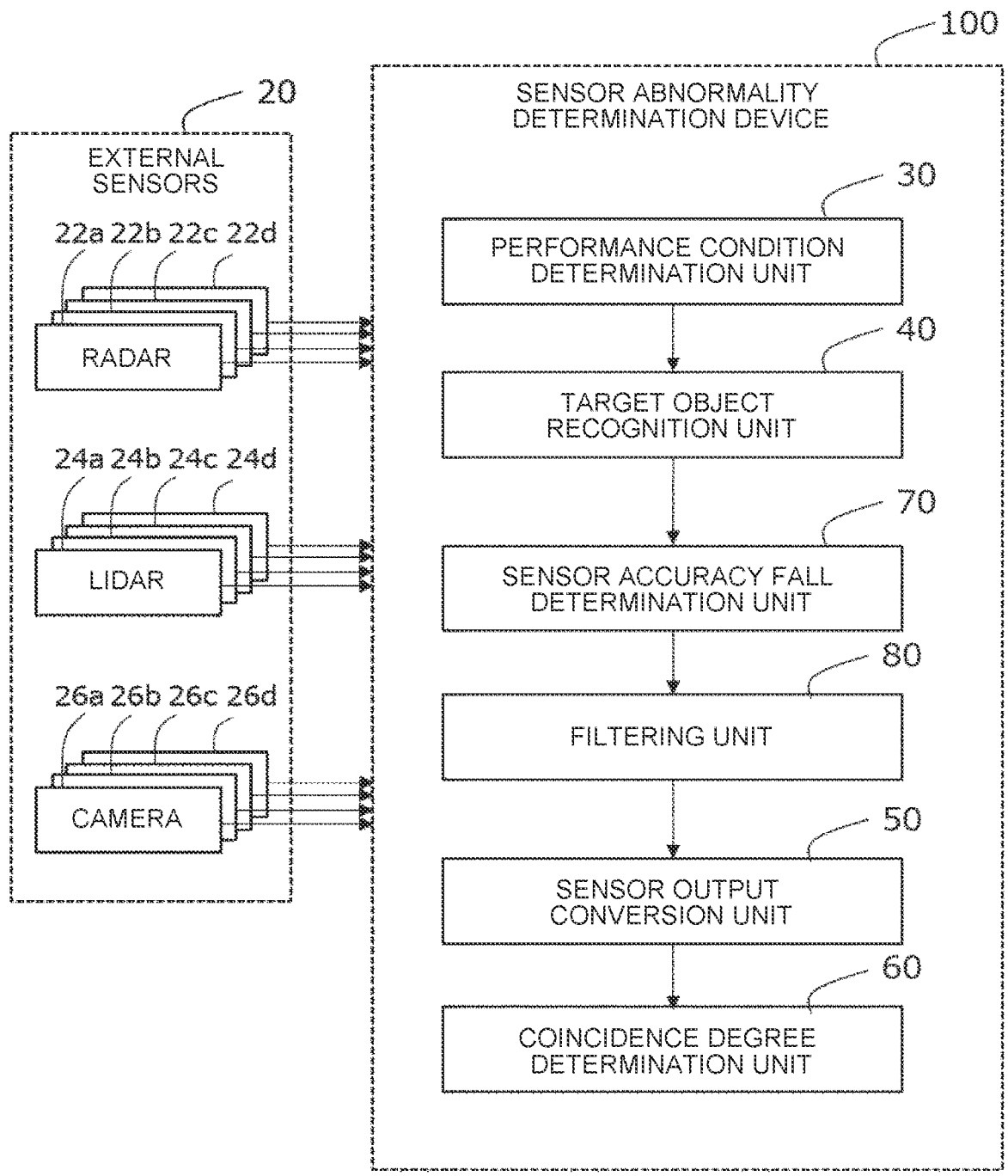
FIG. 11 is a block diagram showing the functions of a sensor abnormality estimation device of the second embodiment.

2-3. Functional Configuration of Sensor Abnormality Estimation Device of Second Embodiment FIG. 11 is a block diagram showing the functions of the sensor abnormality estimation device 100 of the second embodiment. Incidentally, the description of the functions in FIG. 11 which are identical to those of the sensor abnormality estimation device 100 of the first embodiment shown in FIG. 9 will be omitted.

In addition to the functions of the sensor abnormality estimation device 100 of the first embodiment, the sensor abnormality estimation device 100 is further equipped with a sensor accuracy fall determination unit 70 and a filtering unit 80. These units are realized as the function of the in-vehicle computer (ECU) 12 when the processor 12a executes the sensor abnormality estimation program included in the program 12c stored in the memory 12b of the in-vehicle computer 12.

2-3-1. Sensor Accuracy Fall Determination Unit 70

The sensor accuracy fall determination unit 70 is a functional block for performing the sensor accuracy fall determination process for a sensor output transmitted from the target object recognition unit 40. Typically, in the case where the sensor output is a sensor output of one of the radars 22, when a yaw rate of the vehicle 10 computed from the information obtained by the internal sensors 14 is equal to or higher than a predetermined value, the sensor accuracy fall determination unit 70 determines that the sensor accuracy of the sensor has fallen. Alternatively, in the case where the sensor output is a sensor output of one of the LiDARs 24, when the number of high-brightness or low-brightness LiDAR points included in the sensor output is equal to or larger than a predetermined number, the sensor accuracy fall determination unit 70 determines that the sensor accuracy of the sensor has fallen. Alternatively, in the case where the sensor output is a sensor output of one of the cameras 26, when the shutter speed of the camera 26 is equal to or higher than a predetermined shutter speed and the relative speed of the target object OJ is equal to or higher than a predetermined determination threshold A, the sensor accuracy fall determination unit 70 determines that the sensor accuracy of the sensor has fallen. Alternatively, in the case where the sensor output is a sensor output of one of the cameras 26, when the relative speed of the target object OJ is equal to or higher than a predetermined determination threshold B (> the determination threshold A), the sensor accuracy fall determination unit 70 determines that the sensor accuracy of the sensor has fallen. The result of the determination of the sensor accuracy fall determination process is transmitted to the filtering unit 80.

2-3-2. Filtering Unit 80

The filtering unit 80 is a functional block for performing a filtering process for a sensor output of one of the external sensors 20, based on the result of the determination of the sensor accuracy fall determination process transmitted from the sensor accuracy fall determination unit 70. Typically, when the result of the determination of the sensor accuracy fall determination process demonstrates a fall in sensor accuracy of one of the radars 22, the filtering unit 80 performs the filtering process so as not to use the recognition result (sensor output) of the relevant radar 22. Alternatively, when the result of the determination of the sensor accuracy fall determination process demonstrates a fall in sensor accuracy of one of the LiDARs 24, the filtering unit 80 performs the filtering process so as not to use high-brightness or low-brightness LiDAR points of the recognition result (sensor output) of the relevant LiDAR 24. Alternatively, when the result of the determination of the sensor accuracy fall determination process demonstrates a fall in sensor accuracy of one of the cameras 26, the filtering unit 80 performs the filtering process so as not to use the recognition result (sensor output) of the relevant camera 26. The sensor output subjected to the filtering process is transmitted to the sensor output conversion unit 50.

The sensor abnormality estimation device 100 of the second embodiment described hitherto can prevent the sensor output of the external sensor 20 with low sensor accuracy from being utilized in the sensor abnormality estimation process, and hence can reduce the number of erroneous determinations in the sensor abnormality estimation process.

2-4. Modification Example

The sensor abnormality estimation device 100 of the second embodiment may adopt an aspect modified as follows.

Figure 12:
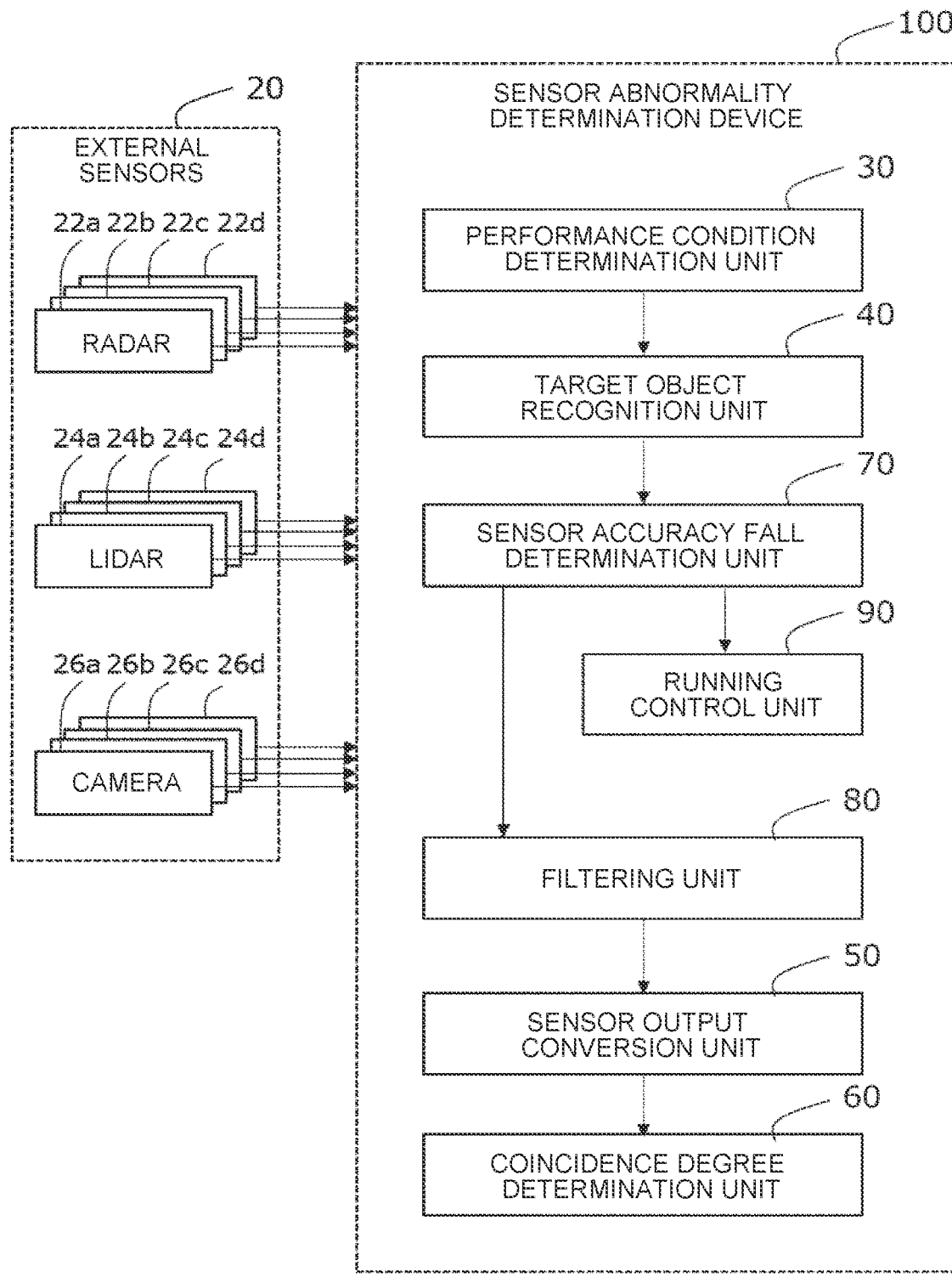
FIG. 12 is a block diagram showing a modification example of the functions of the sensor abnormality estimation device of the second embodiment.

FIG. 12 is a block diagram showing a modification example of the functions of the sensor abnormality estimation device of the second embodiment. Incidentally, the description of the functions in FIG. 12 which are identical to those of the sensor abnormality estimation device 100 shown in FIG. 11 will be omitted.

In addition to the functions of the sensor abnormality estimation device 100 shown in FIG. 11, the sensor abnormality estimation device 100 of the modification example shown in FIG. 12 is further equipped with a running control unit 90. The running control unit 90 is realized as a function of the in-vehicle computer (ECU) 12 when the processor 12a executes the sensor abnormality estimation program included in the program 12c stored in the memory 12b of the in-vehicle computer 12.

The running control unit 90 is a functional block for performing running control of the vehicle 10, based on the result of the determination in the sensor accuracy fall determination process transmitted from the sensor accuracy fall determination unit 70. Typically, the result of the determination in the sensor accuracy fall determination process is transmitted from the sensor accuracy fall determination unit 70 to the running control unit 90. When the result of the determination in the sensor accuracy fall determination process demonstrates a fall in sensor accuracy, the running control unit 90 performs running control for avoiding the fall in sensor accuracy. For example, when the result of the determination in the sensor accuracy fall determination process demonstrates a fall in sensor accuracy of one of the cameras 26, the running control unit 90 acquires a position and a speed of the vehicle 10 on a map, based on information on the position of the vehicle 10 received by the position sensor 16, information on the movement of the vehicle 10 detected by the internal sensors 14, and map information obtained from a map database. Then, when the position of the vehicle 10 is within an intersection, the running control unit 90 controls the actuators 18 such that the vehicle speed of the vehicle 10 remains lower than a predetermined speed limit until the vehicle 10 leaves the intersection. As the predetermined speed limit mentioned herein, a value set in advance as a speed that can restrain the sensor accuracy from falling is used.

This vehicle control can reduce the frequency with which a sensor output is removed through the filtering process, and hence can increase the number of opportunities for performing the sensor abnormality estimation process.

What is claimed is:

1. A sensor abnormality estimation device for a sensor-mounted vehicle mounted with a plurality of external sensors, the sensor abnormality estimation device comprising:
   at least one memory that stores at least one program; and
   at least one processor that is linked with the at least one memory, wherein
   the at least one processor is configured to perform an abnormality estimation process for determining whether or not a position and a speed of the sensor-mounted vehicle fulfill a predetermined performance condition at an intersection where an own lane and a cross lane intersect with each other when the at least one program is executed:
   recognizing a target object with a first sensor among the plurality of external sensors to determine first recognition results;
   recognizing the target object with a second sensor among the plurality of external sensors to determine second recognition results;

projecting the first recognition results and the second recognition results onto a two-dimensional overhead view to determine first projected recognition results and second projected recognition results;

determining a first lap rate of the first projected recognition results and a second lap rate of the second projected recognition results;

performing a comparison between the first lap rate and the second lap rate;

acquiring a degree of coincidence between the first lap rate and the second lap rate based on the comparison; and estimating that there is an abnormality in at least one of the first sensor or the second sensor when the degree of coincidence is lower than a predetermined determination value.

2. The sensor abnormality estimation device according to claim 1, wherein
the first sensor or the second sensor recognizes an object in front of the sensor-mounted vehicle with respect to a traveling direction thereof,
the performance condition is that the sensor-mounted vehicle is stopped at a head of a line of vehicles waiting to enter the intersection in the own lane, and
the target object is a vehicle at a head of a line of vehicles waiting to enter the intersection in a lane opposite the own lane.

3. The sensor abnormality estimation device according to claim 1, wherein
the first sensor or the second sensor recognizes an object to right or left of the sensor-mounted vehicle with respect to a traveling direction thereof,
the performance condition is that the sensor-mounted vehicle travels straight in the own lane at the intersection at a speed lower than a predetermined speed, and
the target object is a vehicle at a head of a line of vehicles waiting to enter the intersection in the cross lane.

4. The sensor abnormality estimation device according to claim 1, wherein
the first sensor or the second sensor recognizes an object behind the sensor-mounted vehicle with respect to a traveling direction thereof,
the performance condition is that the sensor-mounted vehicle travels straight in the own lane at the intersection at a speed lower than a predetermined speed, and
the target object is a vehicle at a head of a line of vehicles waiting to enter the intersection in a right-turn lane or a left-turn lane that is adjacent to the own lane.

5. The sensor abnormality estimation device according to claim 1, wherein
the first sensor or the second sensor recognizes an object behind the sensor-mounted vehicle with respect to a traveling direction thereof,
the performance condition is that the sensor-mounted vehicle turns right or left at the intersection from the own lane to the cross lane at a speed lower than a predetermined speed, and
the target object is a vehicle at a head of a line of vehicles waiting to enter the intersection in the cross lane.

6. The sensor abnormality estimation device according to claim 1, wherein
the at least one processor performs a sensor accuracy fall determination process for determining whether or not an accuracy of the recognition results has fallen when the at least one program is executed, and performs a filtering process for removing the recognition results from a target of the abnormality estimation process when it is determined in the sensor accuracy fall determination process that the accuracy of the recognition results has fallen.

7. The sensor abnormality estimation device according to claim 6, wherein
the speed of the sensor-mounted vehicle at the intersection is controlled to a speed lower than a predetermined speed limit when it is determined in the sensor accuracy fall determination process that the accuracy of the recognition results has fallen.

8. The sensor abnormality estimation device according to claim 6, wherein, in a case where the first sensor is a radar sensor, and when a yaw rate of the sensor-mounted vehicle is greater than or equal to a predetermined value, it is determined in the sensor accuracy fall determination process that the recognition results has fallen.

9. The sensor abnormality estimation device according to claim 6, wherein, in a case where the second sensor is a Lidar sensor, and when a number of high-brightness or low-brightness Lidar points included in the output of the Lidar is greater than or equal to a predetermined value, it is determined in the sensor accuracy fall determination process that the accuracy of the recognition results has fallen.

10. The sensor abnormality estimation device according to claim 6, wherein, in a case where at least one of the plurality of external sensors is a camera, and when a shutter speed of the camera is greater than or equal to a predetermined shutter speed and a relative speed of the target object is greater than or equal to a predetermined threshold, it is determined in the sensor accuracy fall determination process that the accuracy of the recognition results has fallen.

11. The sensor abnormality estimation device according to claim 1, wherein the first sensor is a radar sensor.

12. The sensor abnormality estimation device according to claim 1, wherein the second sensor is a Lidar sensor.

13. The sensor abnormality estimation device according to claim 1, wherein:
the plurality of external sensors further includes a third sensor; and
the at least one processor is configured to perform the sensor abnormality estimation process for two sensors among the first sensor, the second sensor, and the third sensor in a round-robin manner.

* * * * *